United States Patent [19]
Takegami

[11] Patent Number: 6,061,254
[45] Date of Patent: May 9, 2000

[54] FORWARD CONVERTER WITH ACTIVE CLAMP CIRCUIT

[75] Inventor: Eiji Takegami, Tokyo, Japan

[73] Assignee: Nippon Electric Industry Co., Ltd., Tokyo, Japan

[21] Appl. No.: 09/287,821

[22] Filed: Apr. 7, 1999

[30] Foreign Application Priority Data

Apr. 16, 1998 [JP] Japan ................................... 10-106569

[51] Int. Cl.[7] .................................................. H02M 3/335
[52] U.S. Cl. ................................ 363/21; 363/97; 363/131
[58] Field of Search ................................. 363/16, 20, 21, 363/95, 97, 131

[56] References Cited

U.S. PATENT DOCUMENTS

| | | | |
|---|---|---|---|
| 5,309,344 | 5/1994 | Smith | 363/20 |
| 5,471,376 | 11/1995 | Tsai et al. | 363/20 |
| 5,521,807 | 5/1996 | Chen | 363/21 |
| 5,781,421 | 7/1998 | Steigerwald et al. | 363/21 |
| 5,815,380 | 9/1998 | Cuk et al. | 363/16 |
| 5,862,043 | 1/1999 | Youn et al. | 363/21 |
| 5,872,705 | 2/1999 | Loftus, Jr. | 363/21 |
| 5,886,508 | 3/1999 | Jutras | 323/267 |

OTHER PUBLICATIONS

Record of the 29th Annual IEEE Power Electronics Specialists Conference, vol. 2, Fukuoka, Japan, May 17–22, 1998, pp. 1237–1242.

*Primary Examiner*—Adolf Deneke Berhane
*Attorney, Agent, or Firm*—Jordan and Hamburg LLP

[57] ABSTRACT

A forward converter has provided in a primary circuit of a transformer (7) included therein an active clamp circuit comprising an auxiliary coil (9) provided separately from a primary coil (8) of the transformer (7), auxiliary switching element (2) and a capacitor (3), the auxiliary switching element (2) being turned on for a reset period of a main switching element (1) connected in series to the primary coil (8) is turned off, to clamp a voltage across the main switching element (1). Since the operating waveform of the transformer (7) is a square one, a synchronous rectifier is provided in a secondary circuit of the transformer (7) to attain a high efficiency of the forward converter itself. Also, since no isolation element such as a pulse transformer, etc. is required, the forward converter can be designed compact and for higher efficiency and lower cost.

2 Claims, 6 Drawing Sheets

(a)

(b)

(a)

(b)

FORWARD CONVERTER WITH ACTIVE CLAMP CIRCUIT

BACKGROUND OF THE INVENTION

1. Field of the Invention

The present invention relates to a forward converter having an active clamp circuit, selected from switching power sources, that does not require any insulating element such as pulse transformer or the like.

2. Description of Related Art

FIG. 3 shows the circuit configuration of a forward converter with a conventional active clamp circuit.

As shown, a transformer 107 has a primary coil 108 connected at one end thereof to a positive pole of an input DC source 106, and at the other end to a negative pole of the input DC source 106 via a main switching element 101.

Also, a series circuit consisting of an auxiliary switching element 102 and capacitor 103 is connected in parallel to either end of the primary coil 108 of the transformer 107. Thus an active clamp circuit is formed.

The transformer 107 has a secondary coil 109 to which there is connected in parallel a rectifier circuit consisting of a rectifying diode 111 and a commutating diode 112, and a smoothing circuit consisting of a reactor 113 and a capacitor 114, thus forming a choke input type rectifier circuit.

There is provided a control circuit 104 to turn on and off the main and auxiliary switching elements 101 and 102 alternately. The control circuit 104 detects a voltage at a point A of the secondary output circuit to control the auxiliary switching element 102 via a pulse transformer 105 based on the detected voltage. The main switching element 101 is controlled directly by the control circuit 104, not via the pulse transformer 105.

In a forward converter using the above-mentioned active clamp circuit, the main switching element 101 has a drain and source between which there develops a voltage having a waveform $V_{ds}$, as shown in FIG. 4(a). As shown, the voltage has a square waveform $(E_i + V_{ccl})$ where $E_i$ is an input DC source voltage and $V_{ccl}$ is a voltage applied to the capacitor 103.

As seen from FIG. 3, to drive the auxiliary switching element 102, it is necessary to provide an isolation between a gate signal supplied from the control circuit 104 to the main switching element 101 and a gate signal to the auxiliary switching element 102. To this end, the pulse transformer 105 is provided in the gate circuit of the auxiliary switching element 102.

SUMMARY OF THE PRESENT INVENTION

Accordingly, the present invention has an object to overcome the above-mentioned drawbacks of the prior art by providing a forward converter having provided in a primary circuit thereof an active clamp circuit comprising an auxiliary switching element having a source terminal thereof connected to a negative pole of an input DC source, an auxiliary coil connected at one end thereof to a drain terminal of the auxiliary switching element, and a capacitor by which the other end of the auxiliary coil and the negative pole of the input DC source are connected to each other, whereby the auxiliary switching element is turned on for a reset period of a transformer during which a main switching element is turned off, to clamp a voltage across the main switching element.

The above object can be attained by providing a forward converter comprising a primary coil of a transformer, connected at one end thereof to a positive pole of an input DC source, and a main switching element having a drain terminal thereof connected to the other end of the primary coil and a source terminal thereof connected to a negative pole of the input DC source, the forward converter having provided in a primary circuit thereof:

an active clamp circuit comprising an auxiliary switching element having the source terminal thereof connected to the negative pole of the input DC source, an auxiliary coil connected at one end thereof to a drain terminal of the auxiliary switching element, and a capacitor by which the other end of the auxiliary coil and the negative pole of the input DC source are connected to each other; and a control circuit to detect a secondary output circuit voltage and turn on and off the main switching element and the auxiliary switching element in the active clamp circuit alternately based on the detected voltage;

the auxiliary switching element being turned on for a reset period of the transformer during which the main switching element is turned off, to thereby clamp a voltage across the main switching element.

Therefore, since the voltage across the main switching element is suppressed, a main switching element of a low withstand voltage may be used. Since the main and auxiliary switching elements are connected at source terminals thereof to each other and thus have a same potential, no pulse transformer has to be provided. Further, since the operating waveform of the main transformer is flat, a synchronous rectifier may be used in the secondary output circuit, thereby improving the efficiency of the forward converter itself.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 4(a) and (b) show a waveform of a voltage between the drain and source terminals of a main switching element in the forward converter for comparison between the voltage in the prior art and that in the present invention, of which FIG. 4(a) illustrating a waveform of the voltage in the conventional forward converter while FIG. 4(b) illustrates a waveform of the voltage in the present invention;

DETAILED DESCRIPTION OF THE PREFERRED EMBODIMENTS

Figure 1:
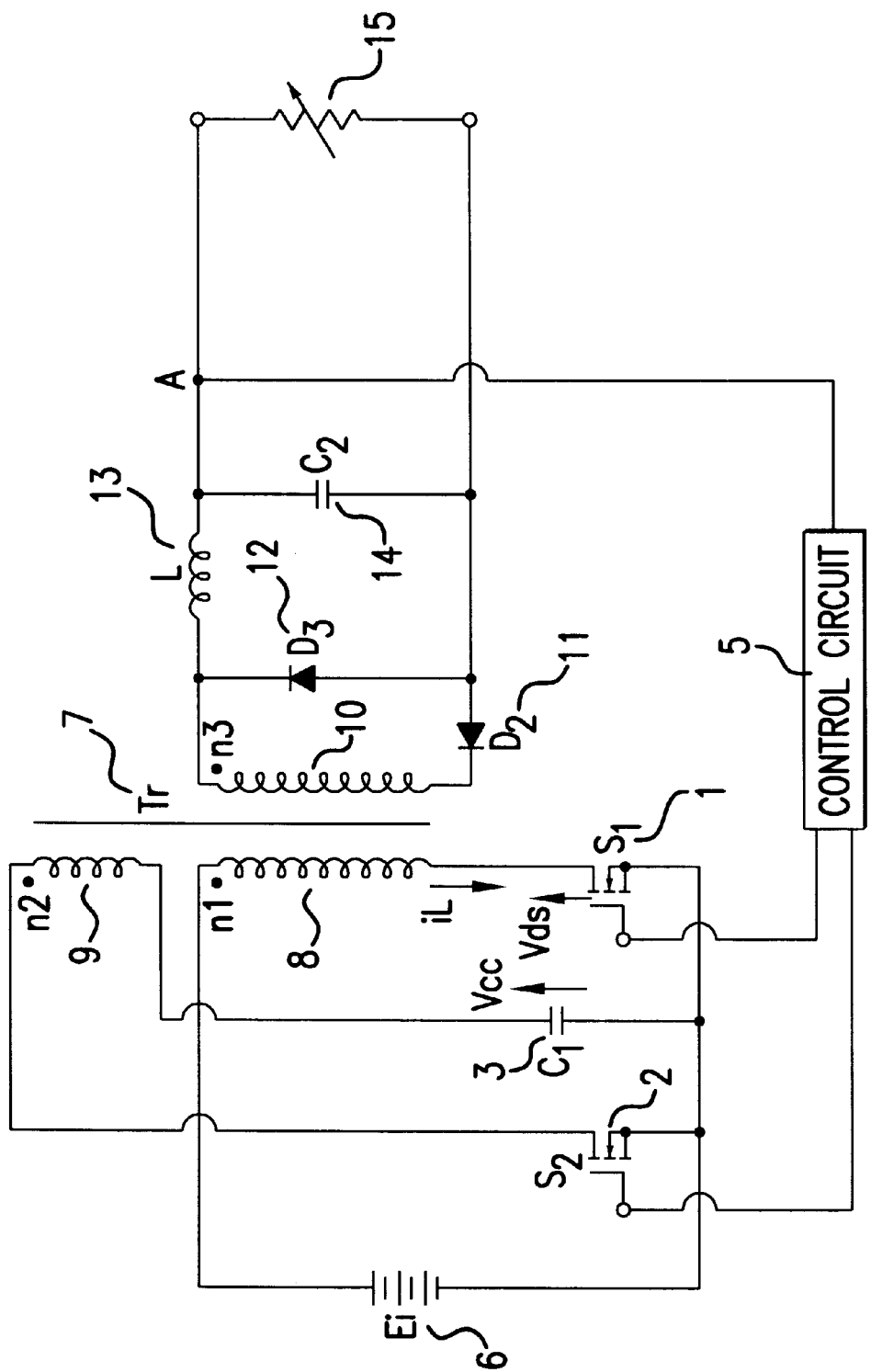
FIG. 1 is a schematic block diagram of a first embodiment of the forward converter of the present invention.

Referring now to FIG. 1, there is illustrated a first embodiment of the forward converter according to the present invention. As shown, there is provided a transformer 7 having a primary coil 8 connected at one end thereof to a positive pole of an input DC source 6, and at the other end to a negative pole of the input DC source 6, via a main switching element 1.

As shown in FIG. 1, an active clamp circuit is formed from an auxiliary coil 9 provided separately from the primary coil 8 of the transformer 7 and having a core common to the primary coil 8, an auxiliary switching element 2 connected a drain terminal thereof to one end of the auxiliary coil 9 and a source terminal thereof to the negative pole of the input DC source 6, and a capacitor 3 provided between the other end of the auxiliary coil 9 and the negative pole of the input DC source 6.

As seen, the transformer 7 has a secondary coil 10. There are connected to either end of the secondary coil 10 in parallel a rectifier circuit consisting of a rectifying diode 11 and a commutating diode 12, and a smoothing circuit consisting of a reactor 13 and a capacitor 14, whereby a choke input type rectifier circuit is formed which supplies a smoothed DC power to a load 15.

The above-mentioned forward converter having the active clamp circuit, according to the present invention, functions as will be described below:

There is provided a control circuit 5 to detect a secondary output voltage of the transformer 7 at a point A and turns on and off the main and auxiliary switching elements 1 and 2 alternately, based on the detected voltage, so that the auxiliary switching element 2 is turned on for a reset period of the transformer 7 during which the main switching element 1 is turned off, thus clamping a voltage across the main switching element 1.

Figure 4:
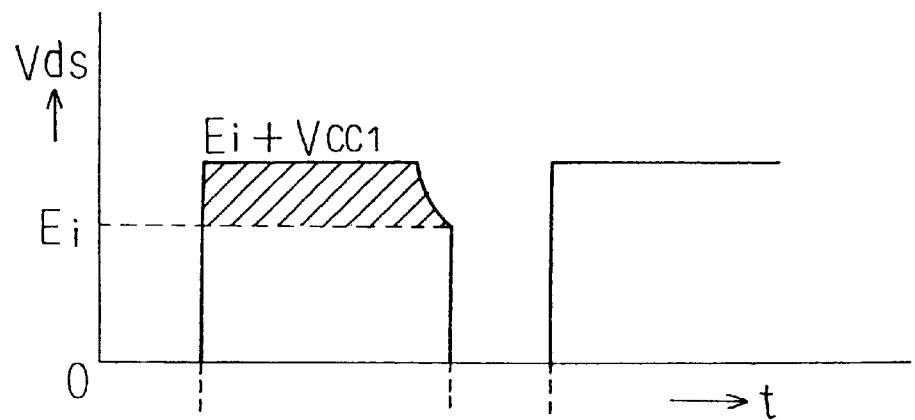
Figure 4:
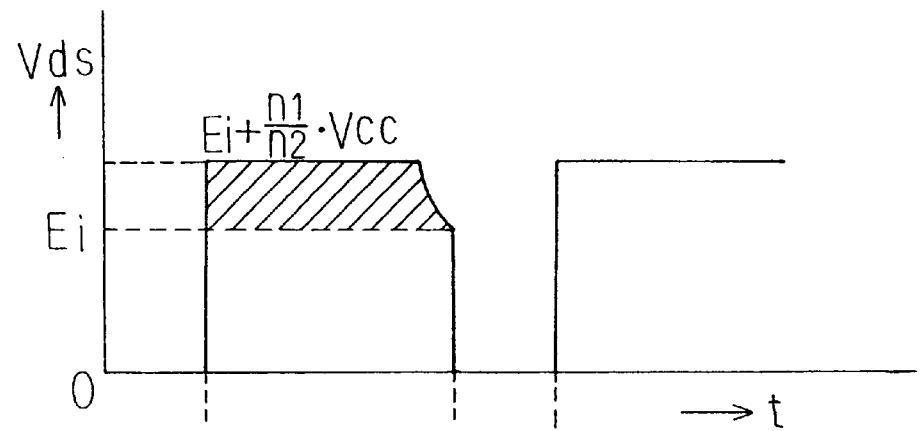

When the voltage $V_{ds}$ across the main switching element 1 is clamped by the active clamp circuit according to the present invention, a flat square wave $(E_i + n_1/n_2 \cdot V_{cc})$ (where $n_1/n_2$ is a turn ratio between the primary and auxiliary coils 8 and 9, $V_{cc}$ is a voltage applied to the capacitor 3 and $E_1$ is an input DC voltage) including no peaks is produced as shown in FIG. 4(b).

Figure 2:
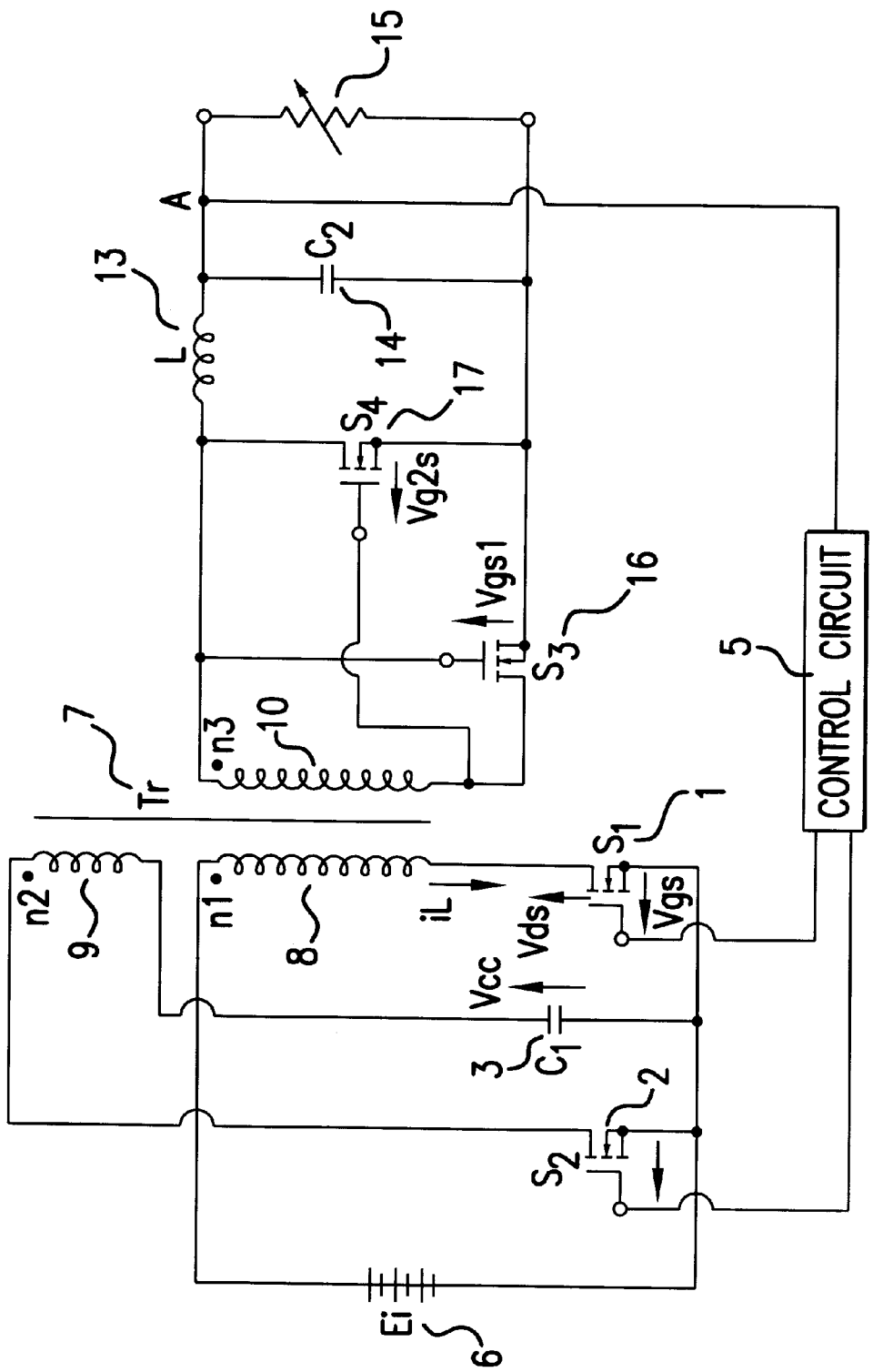
FIG. 2 is a schematic block diagram of a second embodiment of the forward converter of the present invention.
Figure 3:
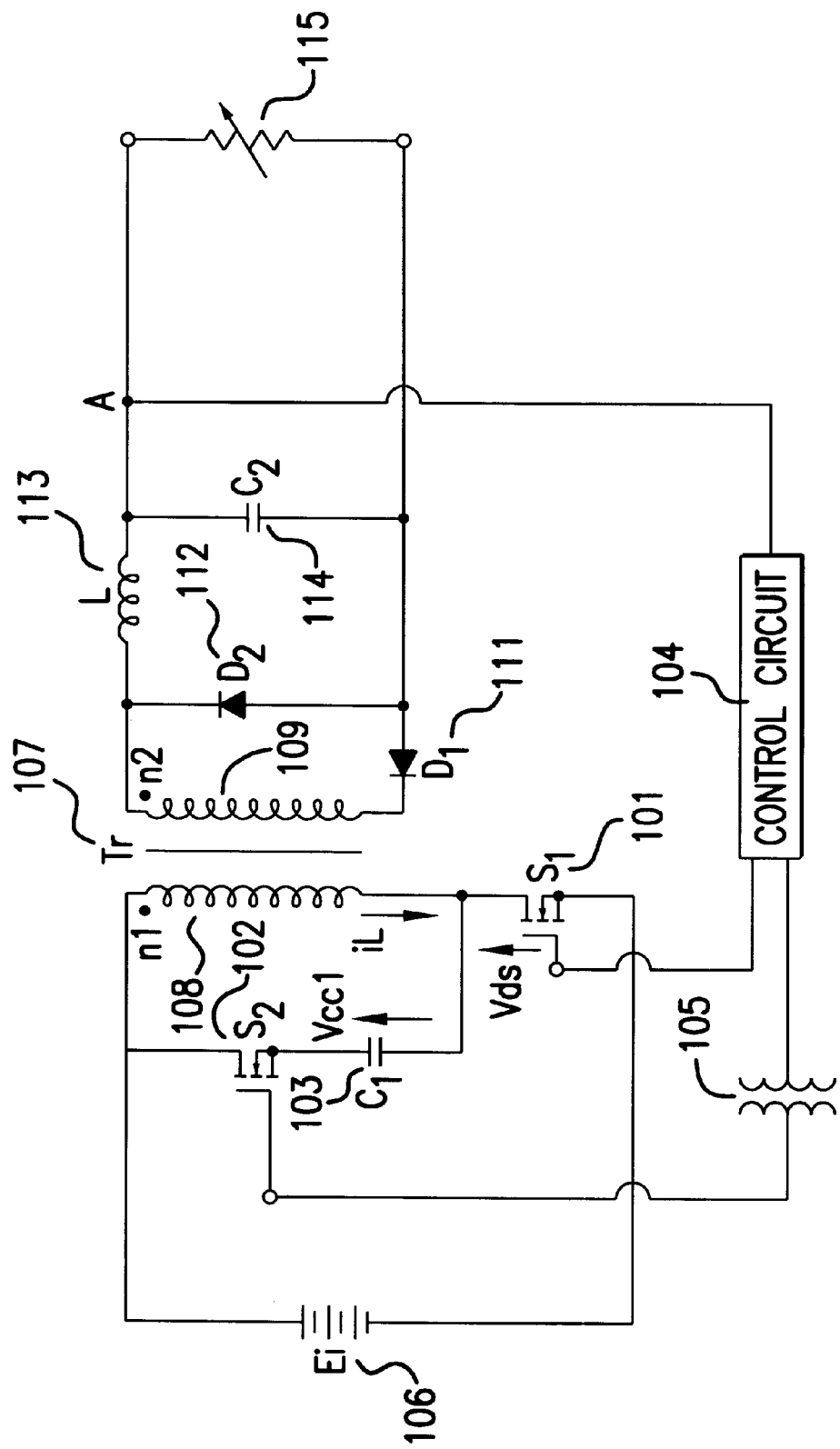
FIG. 3 is a schematic block diagram of a forward converter with a conventional active clamp circuit.

FIG. 2 is a schematic block diagram of a second embodiment of the forward converter according to the present invention.

The active clamp circuit allows the voltage $V_{ds}$ across the main switching element 1 to have a flat square wave. So, a synchronous rectifier may be provided in the secondary output circuit of the transformer 7 to easily drive the forward converter. Namely, in the second embodiment of the present invention, a synchronous rectifier circuit is formed using two switching elements 16 and 17 for rectifying and commutating, respectively, in place of the two diodes included in the secondary output circuit shown in FIG. 2.

The main switching element 1 in the primary circuit and rectifying switching element 16 provided in the secondary circuit are simultaneously turned on and off in opposite phases, respectively, while the auxiliary and commutating switching elements 2 and 17 are simultaneously turned on and off.

Figure 6:
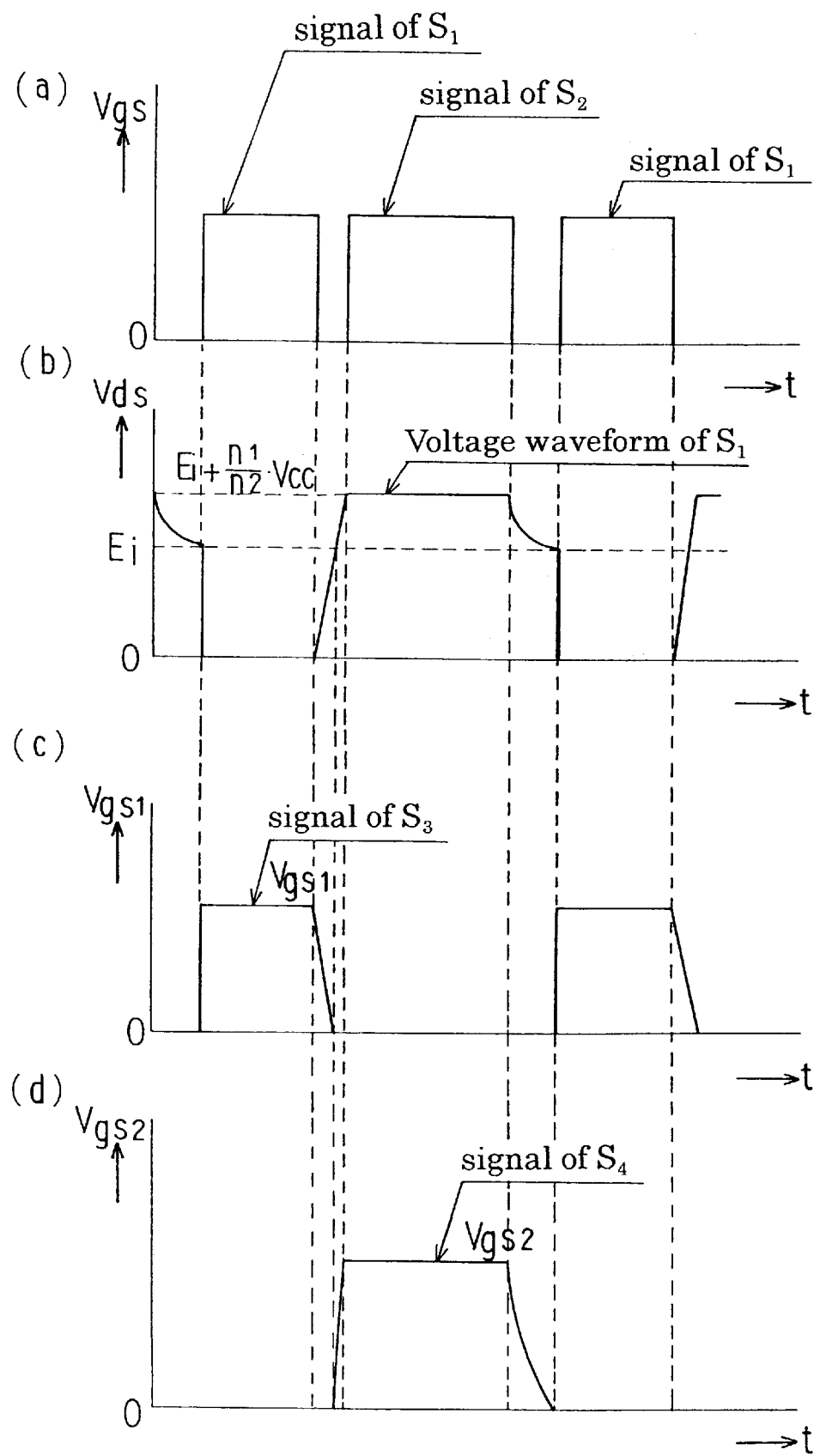
FIGS. 6(a), (b), (c) and (d) show signal waveforms of four switching elements.

FIG. 6 shows signal waveforms of the four switching elements. FIG. 6(a) shows waveform $V_{gs}$ of signal of $S_1$ and $S_2$ between the gate and source terminals of the main and auxiliary switching elements $1(S_1)$ and $2(S_2)$, respectively, FIG. 6(b) shows a flat square waveform $V_{ds}$, voltage waveform of $S_1$ between the drain and source terminals of the main switching element $1(S_1)$, and FIGS. 6(c) and 6(d) show waveforms $V_{gs1}$ and $V_{gs2}$ of a signal between the gate and source terminals of the rectifying and commutating switching elements $16(S_3)$ and $17(S_4)$, respectively.

Figure 5:
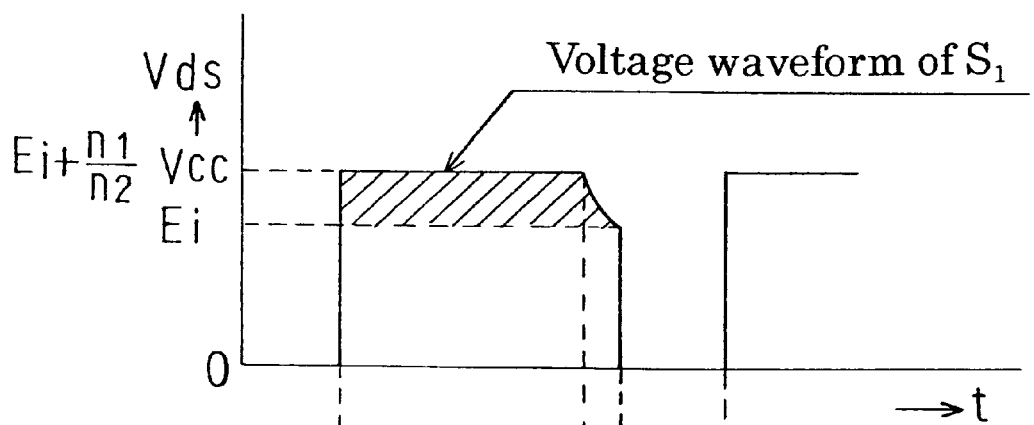
FIGS. 5(a) and (b) show the relationship between the voltage waveform of the main switching element and that of a synchronous rectifier switching element.
Figure 5:
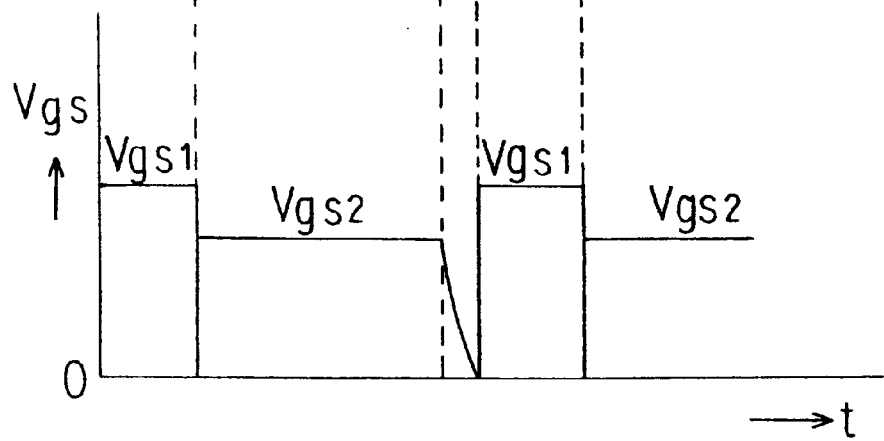

FIGS. 5(a) and (b) show a relation between the voltage waveform $V_{ds}$ of the main switching element $1(S_1)$ and waveforms $V_{gs1}$ and $V_{gs2}$ of a signal between the gate and source terminals of the rectifying and commutating switching elements $16(S_3)$ and $17(S_4)$, respectively. As apparent from FIG. 5(b), there is between the waveforms $V_{gs1}$ and $V_{gs2}$ no time for which the parasitic diode turns on, so that the synchronous rectifier switching element can be utilized for an increased length of time, thus allowing to attain a high efficiency of the forward converter.

As having been described in the foregoing, the forward converter having the active clamp circuit according to the present invention has provided in the primary circuit of the transformer the active clamp circuit composed of the auxiliary coil, auxiliary switching element and capacitor to turn on the auxiliary switching element for a period during which the main switching element is turned off, thereby clamping the voltage across the main switching element. Thus, the main switching element may be a switching element of which the withstand voltage is low.

Since it is not necessary to provided an isolation between the driving signal for the auxiliary switching element in the active clamp circuit and the drive signal for the main switching element, no pulse transformer has to be used, whereby it is possible to reduce the number of parts for forming the forward converter. Thus, there is not any loss of the pulse transformer, which would otherwise take place remarkably even when the forward converter is connected to a light load, thus permitting to improve the efficiency of the forward converter itself.

Moreover, since the operating waveform of the transformer is a square wave, the synchronous rectifier may be used to drive the forward converter. Thus a high efficiency of the forward converter can be attained.

What is claimed is:

1. A forward converter comprising a primary coil of a transformer, connected at one end thereof to a positive pole of an input DC source, and a main switching element having a drain terminal thereof connected to the other end of the primary coil and a source terminal thereof connected to a negative pole of the input DC source, the forward converter having provided in a primary circuit thereof:

an active clamp circuit comprising an auxiliary switching element having a source terminal thereof connected to a negative pole of the input DC source, an auxiliary coil connected at one end thereof to a drain terminal of the auxiliary switching element, and a capacitor by which the other end of the auxiliary coil and the negative pole of the input DC source are connected to each other; and a control circuit to detect a secondary output circuit voltage and turn on and off the main switching element and the auxiliary switching element in the active clamp circuit alternately based on the detected voltage;

the auxiliary switching element being turned on for a reset period of the transformer during which the main switching element is turned off, to thereby clamp a voltage across the main switching element.

2. The forward converter as set in claim 1, wherein a rectifier circuit consisting of two diodes forming the secondary output circuit is formed from a synchronous rectifier circuit consisting of two switching elements.

* * * * *